(12) United States Patent
Raikamo et al.

(10) Patent No.: US 7,908,854 B2
(45) Date of Patent: Mar. 22, 2011

(54) METHOD AND ARRANGEMENT FOR COLLECTING WAVE ENERGY

(75) Inventors: Esko Raikamo, Lempäälä (FI); Markku Oikarainen, Lempäälä (FI)

(73) Assignees: Finn Escone Oy, Lempaala (FI); Oitsu Oy, Lempaala (FI)

( * ) Notice: Subject to any disclaimer, the term of this patent is extended or adjusted under 35 U.S.C. 154(b) by 733 days.

(21) Appl. No.: 11/887,940

(22) PCT Filed: Apr. 5, 2006

(86) PCT No.: PCT/FI2006/050126
§ 371 (c)(1),
(2), (4) Date: Oct. 5, 2007

(87) PCT Pub. No.: WO2006/106183
PCT Pub. Date: Oct. 12, 2006

(65) Prior Publication Data
US 2009/0025382 A1    Jan. 29, 2009

(30) Foreign Application Priority Data
Apr. 7, 2005 (FI) .................................. 20055157

(51) Int. Cl.
*F03C 1/00* (2006.01)
(52) U.S. Cl. ............... 60/498; 60/499; 60/500; 60/505; 60/506
(58) Field of Classification Search .......... 60/495–507
See application file for complete search history.

(56) References Cited

U.S. PATENT DOCUMENTS

| | | | |
|---|---|---|---|
| 3,974,562 A | 8/1976 | Wuchner et al. | |
| 4,111,610 A * | 9/1978 | Brown | 417/332 |
| 4,258,270 A * | 3/1981 | Tornkvist | 290/53 |
| 4,313,716 A * | 2/1982 | Jones | 417/331 |
| 4,408,454 A | 10/1983 | Hagen et al. | |
| 4,598,547 A | 7/1986 | Danihel | |
| 6,269,636 B1 | 8/2001 | Hatzilakos et al. | |

FOREIGN PATENT DOCUMENTS

| | | |
|---|---|---|
| CN | 2353918 Y | 12/1999 |
| DE | 4129180 A1 | 3/1993 |
| DE | 19900614 A1 | 8/2001 |
| FR | 1049062 A | 12/1953 |
| FR | 1172424 A | 2/1959 |
| FR | 2339071 A1 | 8/1977 |
| FR | 2436888 | 9/1978 |
| FR | 2493924 | 11/1980 |
| JP | 58-113583 A | 7/1983 |
| JP | 10-238450 A | 9/1998 |
| SU | 1143872 A1 | 3/1985 |
| WO | WO-2004/113718 A1 | 12/2004 |
| WO | WO-2006/106184 A1 | 10/2006 |

* cited by examiner

*Primary Examiner* — Hoang M Nguyen
(74) *Attorney, Agent, or Firm* — Birch, Stewart, Kolasch & Birch, LLP

(57) ABSTRACT

The invention relates to a method and an arrangement for recovering energy contained by waves. In the arrangement, a plurality of collecting devices (8) is coupled in series. Each collecting device comprises a float (7) coupled by means of a power transmission member (10, 11) to a motion converter (13). The coupling between the collecting devices may be mechanical, the motion converters being coupled up by means of an intermediate shaft (60).

24 Claims, 10 Drawing Sheets

METHOD AND ARRANGEMENT FOR COLLECTING WAVE ENERGY

BACKGROUND OF THE INVENTION

The invention relates to a method and an arrangement for recovering energy contained by waves by means of a plurality of collecting devices, the collecting devices comprising a float whose movement is transferred by means of power transmission members to an actuator. The object of the invention is disclosed more specifically in the preambles of the independent claims of the application.

The problem in current solutions is that wave energy cannot be collected sufficiently efficiently by means of collecting devices.

BRIEF DESCRIPTION OF THE INVENTION

The object of the present invention is to provide a new and improved method and arrangement for recovering energy contained by waves.

The method of the invention is characterized by transferring the movement of the float to a motion converter in each collecting device; converting a reciprocating movement generated by the float into a unidirectional rotational motion in the motion converter; and coupling at least two collecting devices in series.

The arrangement of the invention is characterized in that in each collecting device the movement of the float is arranged to be transferred to a motion converter, a reciprocating movement received by which is arranged to be converted into a unidirectional rotational motion; and further, in which arrangement at least two collecting devices are coupled in series.

The essential idea of the invention is to couple two or more collecting devices so as to generate a larger whole. In addition, each collecting device is provided with means for converting a reciprocating movement generated by the float into a unidirectional rotational motion.

An advantage of the invention is that the energy contained by a weave front can be recovered better than previously by means of a plurality of coupled-up collecting devices.

The essential idea of an embodiment of the invention is that two or more collecting devices are arranged in parallel viewed in the lateral direction. Furthermore, two or more parallel collecting devices are coupled in series.

The essential idea of an embodiment of the invention is that a plurality of collecting devices is arranged in parallel viewed in the lateral direction, the collecting devices being arranged to constitute a row. In addition, two or more rows are arranged in succession.

The essential idea of an embodiment of the invention is that two or more collecting devices are arranged in succession observed in the travel direction of a wave. Furthermore, two or more successive collecting devices are coupled in series.

The essential idea of an embodiment of the invention is that at least one energy converter is arranged in connection with each collecting device for converting motion energy into another energy.

The essential idea of an embodiment of the invention is that the energy converters of at least two collecting devices are coupled up with a connection that transfers mechanical energy.

The essential idea of an embodiment of the invention is that the motion converters of at least two collecting devices are coupled up by means of at least one mechanical power transmission member. The mechanical power transmission member can be an intermediate shaft, for example, for summing up the rotational motions of a plurality of motion converters. The summed-up motion can be transferred by means of one or more power take-off shafts to one or more common energy actuators.

The essential idea of an embodiment of the invention is that the arrangement comprises at least one flywheel for evening out the rotational motion generated with the motion converter. The flywheel can be arranged in connection with the internal structure of the motion converter, in an intermediate shaft between two motion converters or in an output shaft between a motion converter and an energy converter.

The essential idea of an embodiment of the invention is that the collecting devices are supported to the water system by means of an artificial support structure.

The essential idea of an embodiment of the invention is that the collecting devices are supported by means of a support structure to the bottom of a water system, such as a sea, a lake or a river.

The essential idea of an embodiment of the invention is that the collecting devices are supported below a superstructure. The waves are able to pass below the deck and release part of their energy to the collecting devices.

The essential idea of an embodiment of the invention is that the collecting devices are supported to a support structure comprising a cover and a bottom. In this case, the collecting devices are supported between the cover and the bottom.

The essential idea of an embodiment of the invention is that the collecting devices are supported to a floating structure, such as a watercraft, a ferry, a pontoon bridge or the like.

The essential idea of an embodiment of the invention is that the arrangement comprises at least one turning device for setting the direction of the floats in a predetermined position relative to the travel direction of the waves.

The essential idea of an embodiment of the invention is that the motion converter is coupled to one or more electric generators, whereby the energy collected from the waves is converted to electric energy by means of the generator.

The essential idea of an embodiment of the invention is that the motion converter is coupled to one or more pumps, which are arranged to pump some medium, such as a gas or a liquid, for example.

The essential idea of an embodiment of the invention is that the motion converter is coupled to drive a mechanical device, such as a mill or a sawing device, for example.

The essential idea of an embodiment of the invention is that the horizontal movement of the floats of the collecting devices is restricted in a direction transverse relative to the travel direction of the waves. This enables the placement of a plurality of collecting devices laterally adjacently without risk of collision. Furthermore, the motion restrictors can be used to reduce the loadings directed to the support bars, the articulations and the rest of the structure.

The essential idea of an embodiment of the invention is that the cross-section of at least one support bar of the collecting device is flat, and that the support bar is arranged in such a manner that it has a relatively large surface area in a direction transverse relative to the travel direction of a wave, but at the same time a relatively small surface area against the travel direction of the wave. This being so, the support bar is able to prevent lateral movements of the float without, however, its flow resistance in the water being high.

The essential idea of an embodiment of the invention is that the collecting device comprises means for adjusting the height of the float relative to the water level. The mass of the float can be changed for instance by varying the amount of water or air inside the float. In this way, the float can be adjusted in such a manner that it receives the energy comprised by the waves in the best possible way under current wave conditions. It is further possible to adjust the float deep in the water because of storms and ice conditions, thus avoiding damage to the collecting device. On the other hand, in wave conditions corresponding to normal operating condition, the adjustment can be used to keep the float at the uppermost surface layer of water, immediately below the surface, wherein the energy contained by the waves is at its largest.

The essential idea of an embodiment of the invention is that the float of the collecting device is an elongated cylinder having a substantially round or oval cross-section. The cylinder can be supported to the body of the collecting device in the area of both its ends or at its middle portion. By arranging a plurality of such collecting devices in parallel, a relatively long formation can be easily generated for receiving the wave energy well.

BRIEF DESCRIPTION OF THE FIGURES

Some embodiments of the invention will be described in more detail in the accompanying drawings, wherein FIGS. 1a and 1b schematically show a wave advancing in water and the movement of water molecules in the water, FIG. 2a schematically shows a side view of a collecting device according to the invention, FIGS. 2b to 2e schematically show the movements of the float of a collecting device according to the invention by the action of waves, FIG. 3 schematically shows a perspective view of a second collecting device according to the invention, whose float is supported with four support bars to a body, FIG. 4 schematically shows a side view of a third collecting device according to the invention, arranged in a vertical wall surface, FIG. 5 schematically shows a side view of a fourth collecting device according to the invention, comprising at least one support bar, whose longitudinal motion is received with an actuator, FIG. 6 schematically shows a side view of a fifth collecting device according to the invention, wherein the float is supported with at least one support bar, whose longitudinal motion and turning motion are received in an actuator with its special means, FIG. 7 schematically shows a manner of arranging a plurality of collecting devices as a larger collecting unit, and the figure also shows a manner of supporting the collecting devices to the bottom by means of a support structure, FIG. 8 schematically shows a second manner of supporting the collecting devices to the bottom by means of a support structure, FIG. 9 schematically shows a structure, in connection with which the collecting devices of the invention can be applied, FIG. 10 schematically shows in partial section a motion converter for converting the reciprocating motion of one or more support bars in a collecting device into a unidirectional rotational motion, FIGS. 11a and 11b schematically show some manners of coupling two or more collecting devices successively in series or parallel in series, FIG. 12a schematically shows a collecting device provided with a turning mechanism.

For the sake clarity, the figures show the invention in a simplified manner. In the figures, like parts are denoted with like reference numerals.

DETAILED DESCRIPTION OF SOME EMBODIMENTS OF THE INVENTION

Figure 1A:
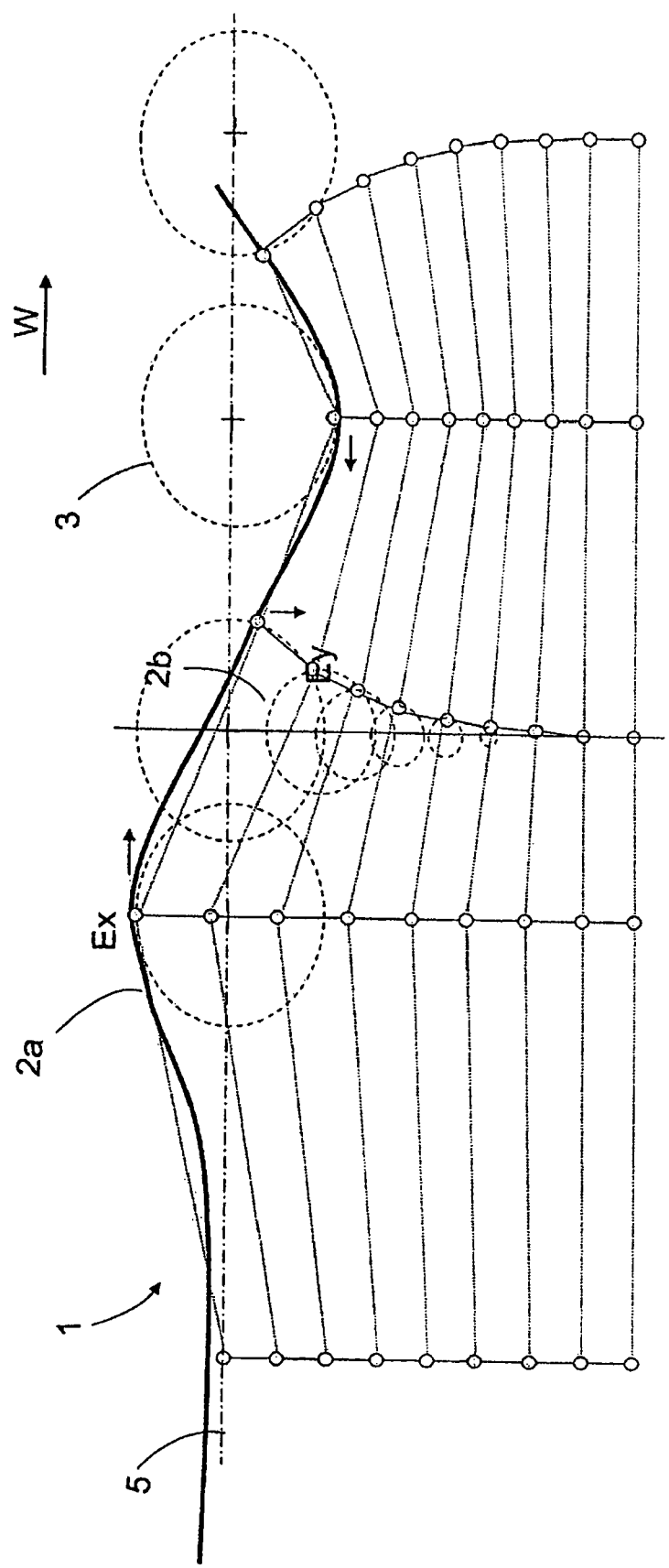
Figure 1B:
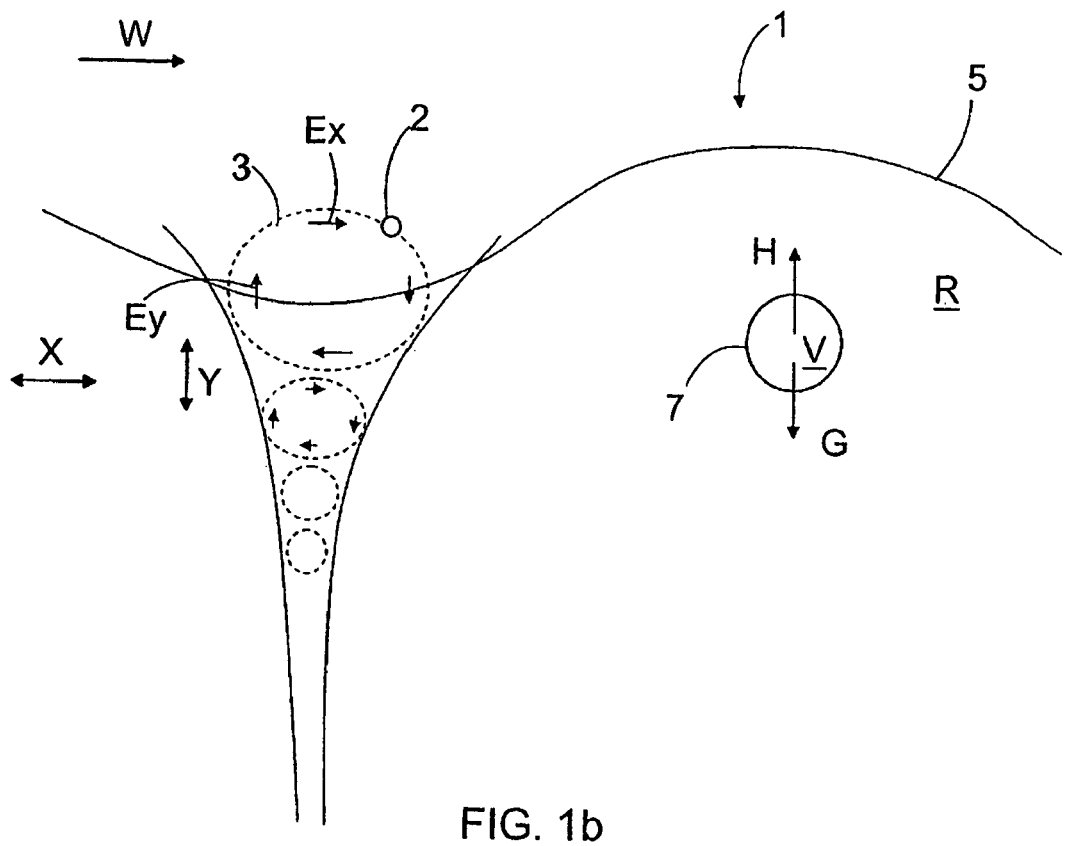

Waves 1 shown in FIGS. 1a and 1b comprise both potential energy Ey and motion energy Ex. Potential energy Ey is generated as a result of a variation in the height of the water molecules in the vertical direction Y. Motion energy Ex, in turn, is generated as a result of a reciprocating horizontal motion of the water molecules 2. When the water molecule 2 is close to the trough of a wave 1, its potential energy Ey is low and motion energy Ex high. The situation is reverse for a water molecule 2 at the crest of a wave 1. By the action of these two simultaneous energies Ex, Ey, the water molecules 2 move along a circular or elliptical, curved path 3. This motion of the water molecules 2 extends by a distance from the surface 5 of water towards the bottom 6. The depth of the motion of the water molecules depends for instance on the magnitude of the distance from the surface 5 to the bottom 6. Similarly, the shape of the curved path 3 depends for instance on the distance of the surface 5 of water to the bottom 6. For example, in the area of so-called free water, wherein the distance to the bottom 6 is long, the curved path 3 may be substantially circular and extend quite deep into the water mass. In contrast, in the area of shallow water, the bottom 6 affects the motion of the water molecules 2 in such a manner that the curved path 3 may take an elliptical form.

FIG. 1b further shows a float 7, which is subject to gravitation G in direction Y. On the other hand, the float 7 in the water is subject to a buoyant force H, whose magnitude depends on the volume V of the float 7 and the density R of the water. The deeper the float 7 is in the water at each particular time, the larger is the buoyant force H. The depth where the float 7 floats in the water can be affected by adjusting the mass of the float 7. It is preferable to arrange the float 7 in the water in such a manner that it is substantially entirely below the surface 5 of water. This being so, its entire surface area may be subjected to the energies contained by the waves. On the other hand, the force acting on the float 7 is at its largest at the surface layers of the water, since the energy bound to the water molecules 2 is reduced in proportion to the distance from the surface 5. Although attempts are made to keep the float 7 continuously and substantially entirely below the surface of water, in some situations part of the float 7 may be forced to emerge instantaneously above the surface of water.

Figure 2A:
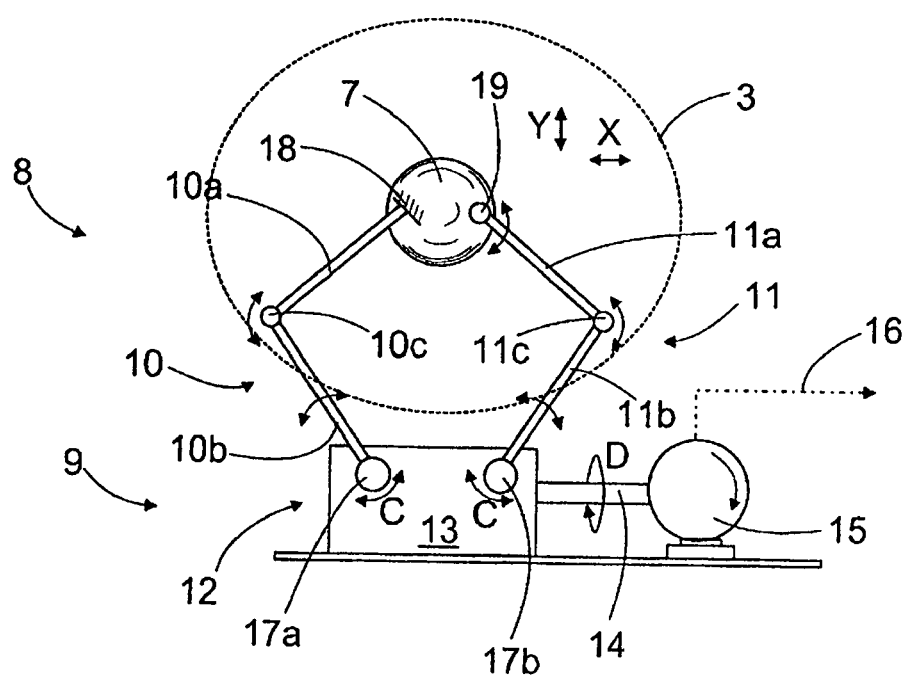
Figures 2B, 2C:
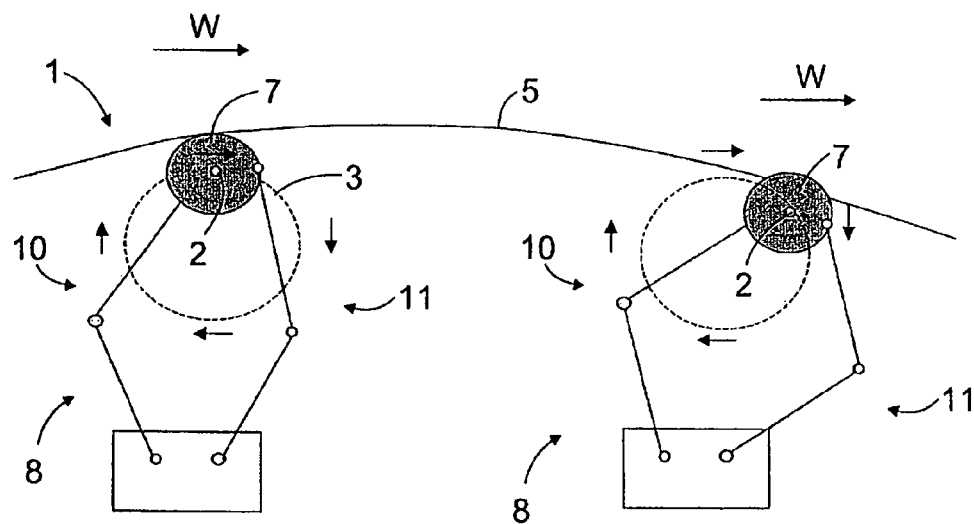
Figures 2D, 2E:
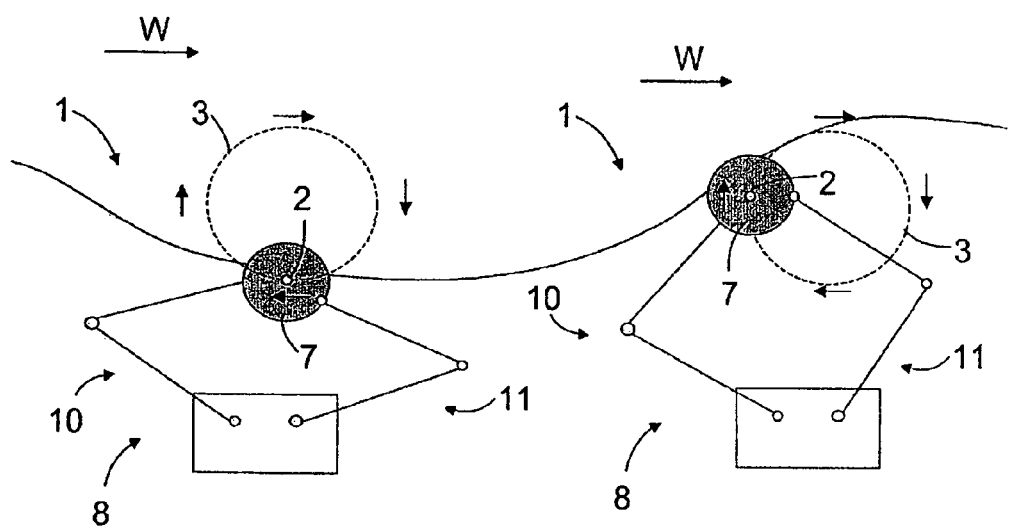

FIG. 2a shows a collecting device 8 that may comprise one or more floats 7, a body 9, and a first support bar 10 and a second support bar 11 for coupling the float 7 to the body 9. The collecting device 8 may further comprise an actuator 12 for receiving the motion of the support bars 10, 11. The actuator 12 may be a motion converter 13 that is able to convert a plurality of reciprocating motions C into a unidirectional rotational motion D. The motion converter 13 may be coupled by means of a power take-off shaft 14 to an energy converter 15, which may be a generator, for example, for converting motion energy into electrical energy. The electricity generated may be conveyed by means of a conductor 16 to an electrical network, for example.

The first support bar 10 may be composed of an upper part 10*a* and a lower part 10*b*, which are coupled up by means of an articulation 10*c*. Accordingly, the support bar or support arm may be a kind of an articulation mechanism. Similarly, the second support bar 11 may comprise parts 11*a* and 11*b*, and an articulation 11*c*. The support bar 10, 11 is an elongated member capable of transferring forces both in its longitudinal direction and its transverse direction. In some cases, the support bar 10, 11 may be a curved piece or otherwise suitably shaped. The motions of the float 7 in different directions can be transferred to the motion converter 13 by means of the support bar 10, 11 or the support arm. The lower end of the support bar 10 is coupled to a feed shaft 17*a* in the motion converter 13, and, similarly, the lower end of the support bar 11 is coupled to a feed axis 17*b*. The upper end of the support bar 10 is coupled to the float 7 with a fixed fixation 18 without articulation, whereby the upper part 10*a* of the support bar 10 is immobile relative to the float 7. However, the movement of the float 7 causes the articulation 10*c* to move relative to the motion converter 13, whereby the lower part 10*b* of the support bar 10 turns the feed shaft 17*a* in direction C. Furthermore, the upper part 11*a* of the second support bar 11 may be coupled to the float 7 by means of the articulation 18.

The float 7 shown in FIG. 2*a* may be a substantially spherical piece having a round or oval cross-section. Alternatively, the float 7 may be some other floating container provided with a curved outer surface.

FIGS. 2*b* to 2*e* illustrate the action of water 1 on the operation of the collecting device 8. The potential energy and motion energy comprised by a wave 1 make the float 7 move along a circular or elliptical, curved path 3. As the figures show, a bar 10, fastened rigidly to the float 7, keeps the float continuously in a position allowing the float 7 to move along the curved path 3. A plurality of collecting devices 8 similar to those in FIGS. 2*b* to 2*e* can be coupled in series.

Figure 3:
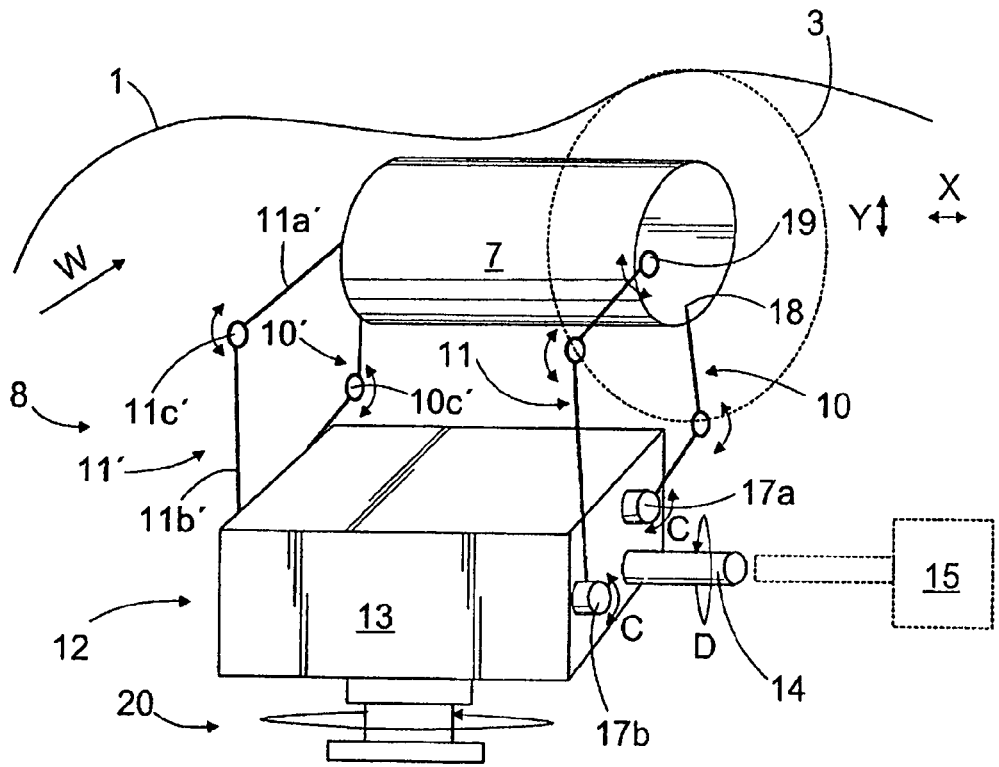

The collecting device 8 shown in FIG. 3 comprises a cylindrical float 7, whose cross-section may be round or oval, or furthermore, the outer surface of the cross-section may be composed of a plurality of curved parts. The float 7, provided with a curved shape, may have a lower friction when moving in liquid than a float provided with an angular shape. Furthermore, the elongated float 7 has a large surface area for receiving wave 1 energy. The collecting device 8 may be arranged in such a manner that its elongated float 7 is transversely relative to the direction of motion of the wave 1 under normal wave conditions. Furthermore, it is possible to provide the collecting device 8 with a turning mechanism 20, which enables the turning of the entire collecting device 8 or only one float 7 according to the direction of motion of the waves 1. Automatic means for identifying the direction of motion of the waves and for adjusting the position of the float 7 accordingly may also be arranged in connection with the collecting device 8. Furthermore, it is possible to immerse the float 7 deeper into the water for instance during storms or when the surface of water is frozen and thus prevent the collecting device 8 from being damaged.

The elongated float 7 may be supported at its first end by means of support bars 10 and 11 and at its second end by means of support bars 10' and 11'. The support bars 10 and 10' may be coupled to the same or a different feed shaft 17*a*, and similarly, the support bars 11 and 11' may be coupled to the same or a different feed shaft 17*b*. A plurality of collecting devices 8 similar to those in FIG. 3 can be coupled in series.

Figure 4:
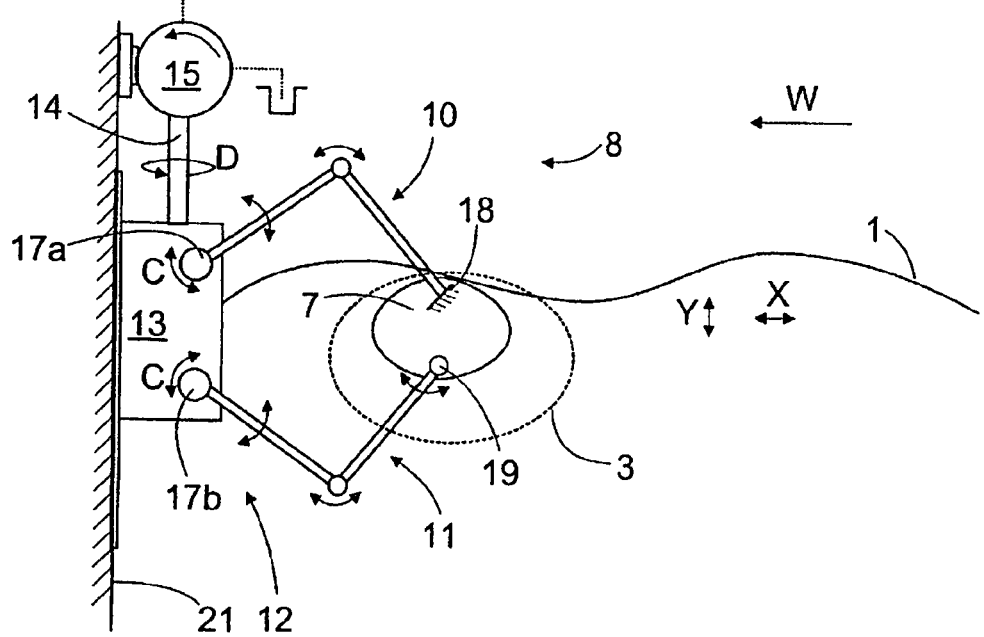

In FIG. 4, the collecting device 8 is fastened to a vertical wall surface 21, such as for example the wall of a pier, a support leg of an oil-drilling rig, a breakwater or another suitable location. The collecting device 8 shown in FIG. 4 may be substantially similar to the device shown in FIG. 3. The motion converter 13 may be arranged to operate a pump, which in this case acts as the energy converter 15. The pump may be arranged to pump water, hydraulic medium, such as oil, or it may be arranged to pump some suitable gas, such as air, for example. The pressure medium may be conveyed out from the pump along a conduit 22. A plurality of collecting devices 8 similar to those in FIG. 4 can be coupled in series.

Figure 5:
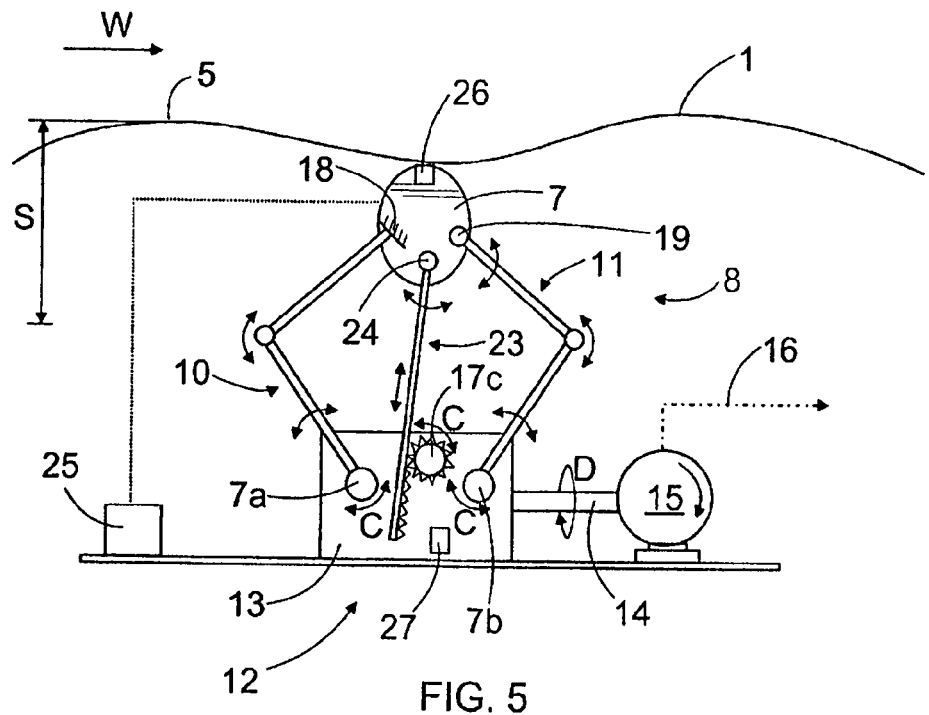

In the collecting device 8 shown in FIG. 5, the cross-section of the float 7 is oval. Furthermore, the float 7 may be supported not only with the support bars 10 and 11, but also with a third support bar 23. Alternatively, the third bar 23 may replace the support bar 11. The upper end of the third support bar 23 may be articulated with an articulation 24 to the float 7 and its lower end may be arranged to operate the feed shaft 17*c* of the motion converter 13. The lower end of the third support bar 23 may be provided with a toothing and similarly, the feed shaft 17*c* may comprise a toothed wheel, whereby the longitudinal motion of the third support bar 23 achieves the reciprocating motion of the feed shaft 17*c* in direction C.

The collecting device 8 shown in FIG. 5 may further comprise an adjusting device 25 for adjusting the mass of the float 7 in such a manner that the float 7 can be placed in a surface depth, at the desired distance S from the surface 5 of water. The adjusting device 25 may be arranged to let water into the float 7 or remove water from it. Other manners of adjusting the mass may naturally be applied. The float 7 may comprise one or more sensors 26, which may identify the position of the float 7 relative to the surface 5 of water. Alternatively, one or more sensors 27 may be arranged in connection with the motion converter 13 for determining the vertical position of the float 7 on the basis of the paths of the feed shafts 17. A plurality of collecting devices 8 similar to those in FIG. 5 can be coupled in series.

Figure 6:
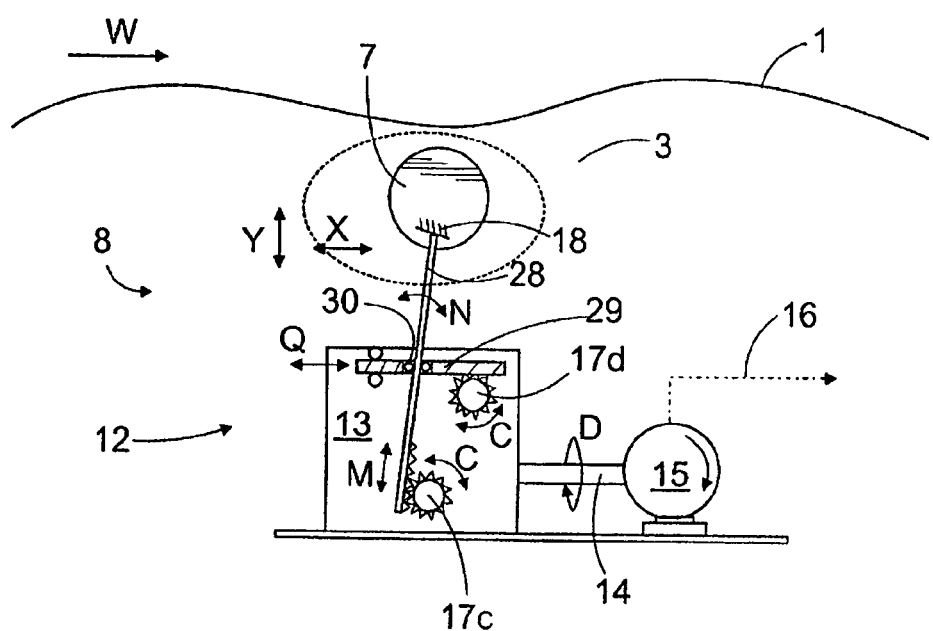

FIG. 6 shows a collecting device 8, whose float 7 may be coupled by means of one support bar 28 to an actuator 12. The upper end of the support bar 28 is coupled with a fixed fixation 18 to the float 7, whereby the support bar 28 moves in the longitudinal direction M and turns in direction N. The support bar 28 may comprise means for transferring its motion in the longitudinal direction M to the feed shaft 17*c*. Furthermore, the support bar 28 may be coupled to a slide 29, by means of which the turning motion N can be converted into a linear motion Q. The slide 29 may be arranged to operate the feed shaft 17*d*. A coupling may exist between the slide 29 and the support bar 28, which does not receive the longitudinal motion M of the support bar 28, but only transfers transverse motion. The slide 29 may comprise an opening that may be provided with a suitable bearing 39 in such a manner that the support bar 28 is allowed to move freely in its longitudinal direction. A plurality of collecting devices 8 similar to those in FIG. 6 can be coupled in series.

Let it be pointed out that the floats 7 shown in FIGS. 4, 5, and 6 may be elongated cylinders or other kinds of floating containers.

Figure 7:
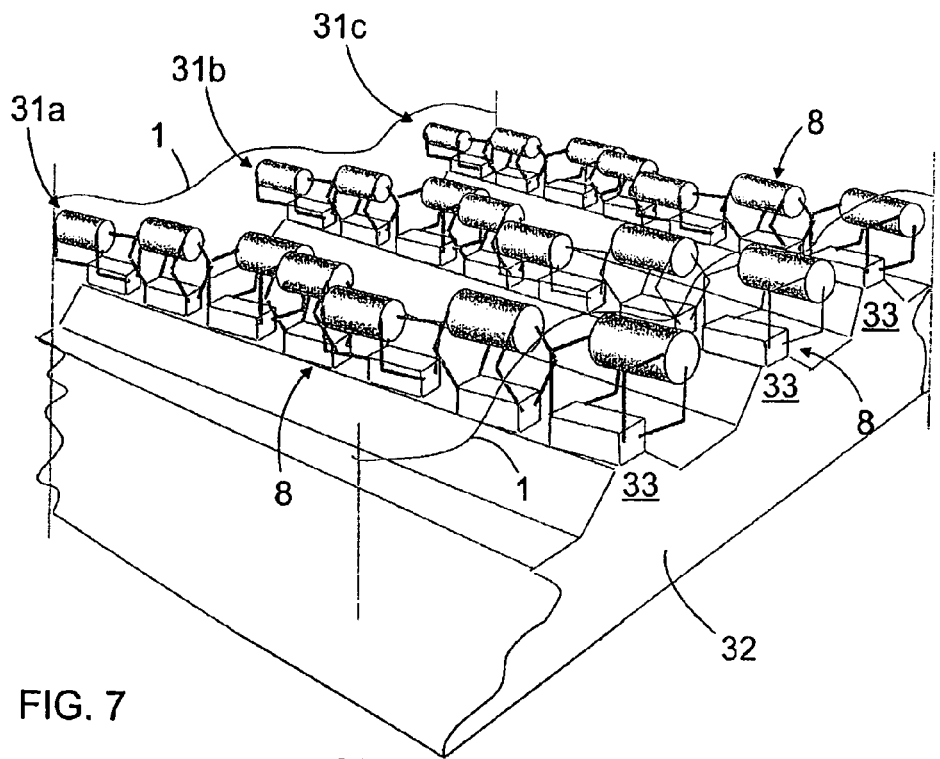

In FIG. 7, a plurality of collecting devices 8 is arranged in such a manner that they form a kind of 'collecting device park' having a plurality of rows 31*a* to 31*c*. The collecting devices 8 on the first row 31*a* receive the wave 1 first, whereby they are able to collect a larger amount of energy from the wave than the collecting devices 8 of the following rows 31*b* and 31*c*. However, a large amount of energy remains in the wave 1 that has passed the first row 31*a*, and that energy can be recovered with the collecting devices 8 arranged in the following rows 31b and 31c. The collecting devices 8 are arranged in such a manner that adjacent devices do not interfere with each other.

FIG. 7 further shows that the collecting devices 8 may be supported to the bottom of the water system by means of a support structure 32. The support structure 32 may be a kind of embankment 33, by means of which the collecting devices 8 can be placed at a suitable distance from the surface of water. When need be, the support structure 32 may be constructed on some suitable platform in the water instead of the bottom of the water system. Together, the support structure 32 and the collecting devices 8 may constitute a breakwater.

Figure 8:
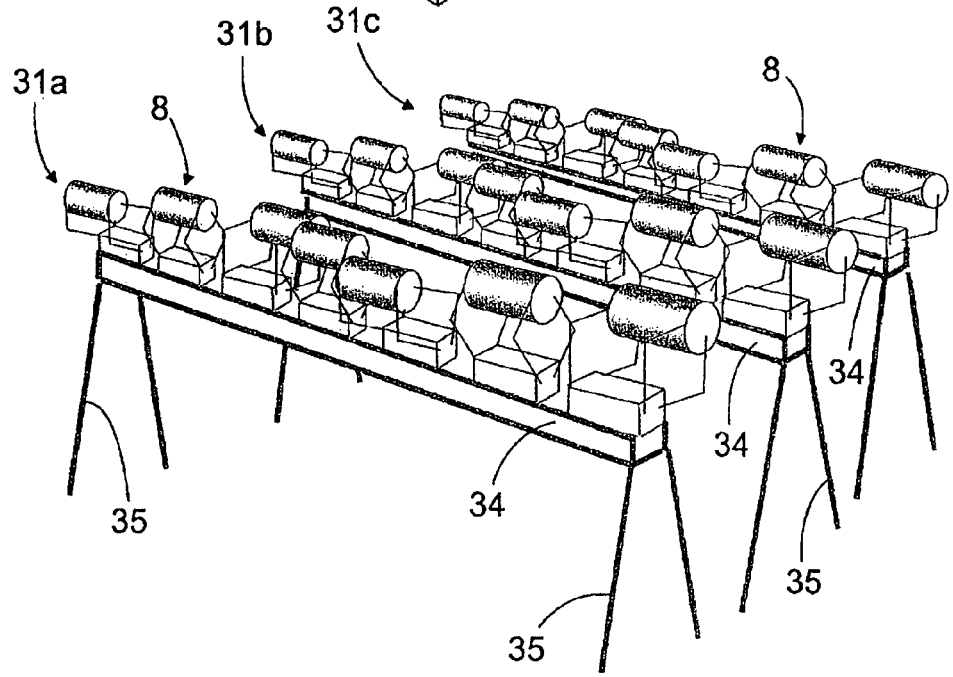

FIG. 8 shows a second alternative for supporting the collecting devices 8 to the bottom of a deep sea, for example. The support structure 32 may be a grid structure or a suitable console 34, which supports the collecting devices 8, arranged as rows 31a to 31c, by means of support feet 35.

Figure 9:
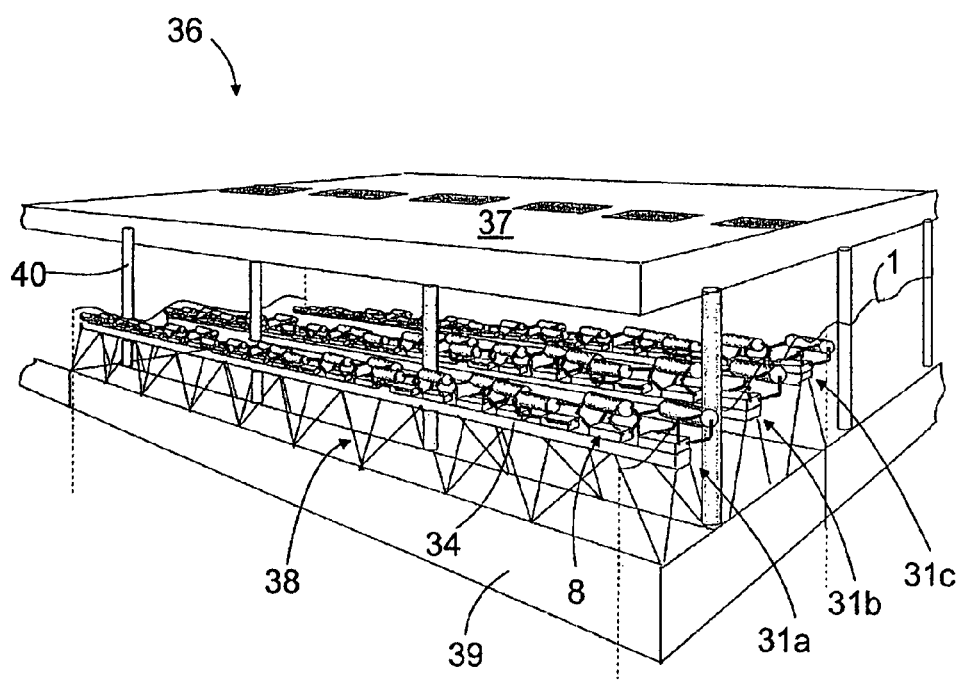

FIG. 9 shows a structure 36 comprising a cover 37 and a plurality of collecting devices 8 arranged below the cover. The collecting devices 8 may be supported by means of consoles 34 and grid structures 38 or in some other suitable manner. Furthermore, the collecting devices 8 may be arranged as rows 31a to 31c in the manner shown in the previous FIGS. 7 and 8. In addition, the structure 36 comprises a bottom piece 39, which may support the cover 37 by means of supports 40. Alternatively, the cover 37 is supported by means of the supports 40 directly to the bottom of the water system. The bottom piece 39 may be a floating piece. The collecting devices 8 may be supported either to the bottom piece 39 or to the cover 37 of the structure 36, either directly or by means of suitable support members. The cover 37 may act as an airfield, platform for solar cells or windmills or as a foundation for buildings. Since the waves 1 are able to pass between the cover 37 and the bottom piece 39, the loading caused by the waves 1 to the structure 36 is relatively small.

For the sake of clarity, FIGS. 7 to 9 do not show the coupling between the collecting devices, which may be a mechanical coupling, an electrical coupling, a pneumatic coupling or a hydraulic coupling.

Figure 10:
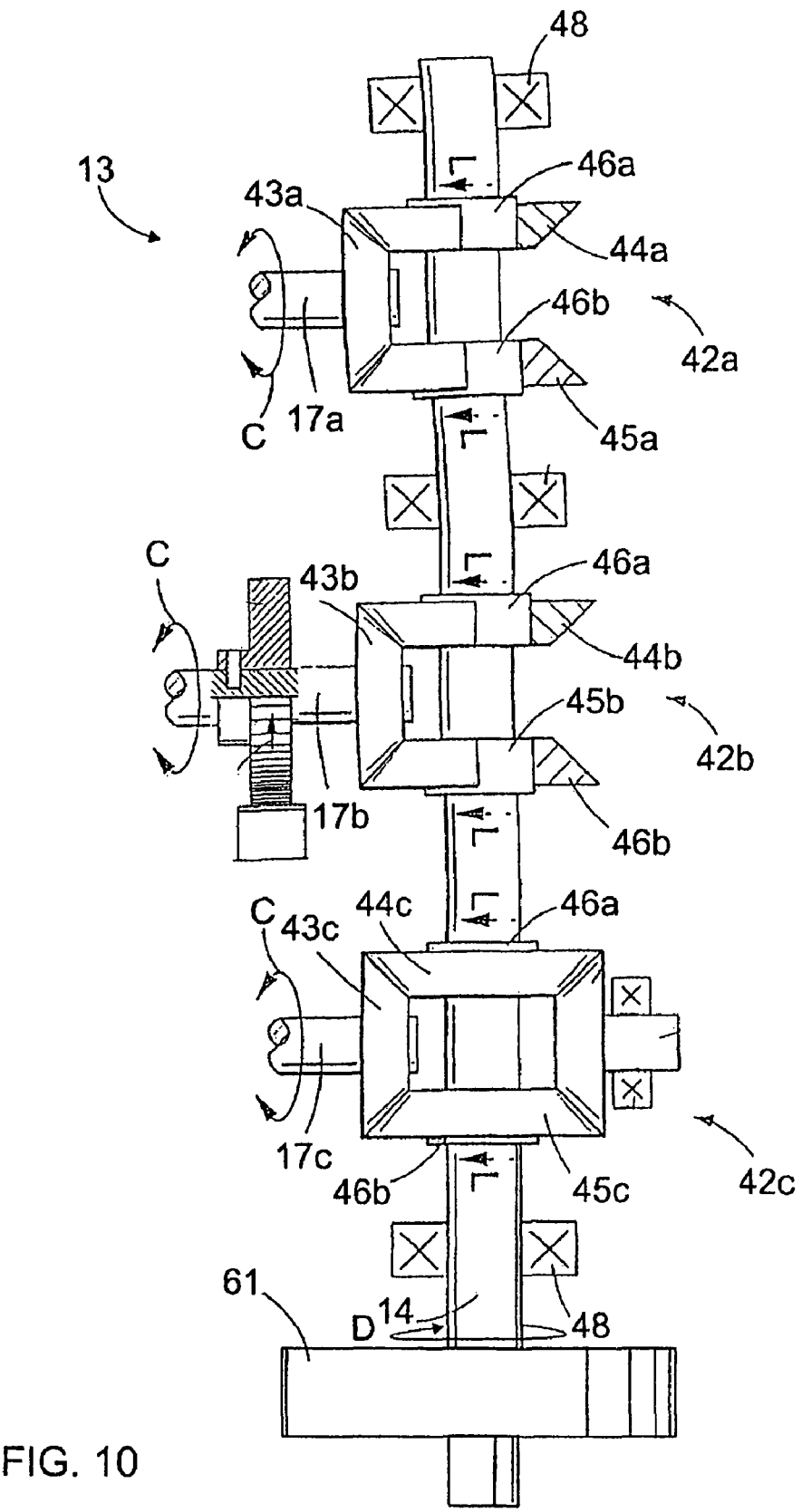

FIG. 10 shows the principle of a motion converter 13. The support bars of the float may be arranged to turn feed shafts 17a to 17c back and forth in direction C. The swinging motion of the feed shafts 17a to 17c is transferred to direction deflection means 42a to 42c, which may comprise first toothed wheels 43a to 43c, second toothed wheels 44a to 44c, and third toothed wheels 45a and 45b. Furthermore, the direction deflection means 42 may comprise dummy couplings 46a and 46b, whose detaining direction is denoted by arrow L in FIG. 10. A power take-off shaft 14 is supported with bearings 48 to the body of the motion converter 13. When the reciprocating motion is brought with each feed shaft 17 to the first toothed wheel 43, the motion is transferred to the second toothed wheel 44 and similarly, to the third toothed wheel 45. The second toothed wheel 44 is able to transfer the motion by means of a dummy coupling 56a in one direction to the power take-off shaft 14, whereby the dummy coupling 56a does not transfer the rotational motion in the opposite direction. Similarly, the third toothed wheel 45 is able to transfer the motion by means of a dummy coupling 56b in one direction to the power take-off shaft 14, whereby the dummy coupling 56b does not transfer the rotational motion in the opposite direction. The detaining directions L of the dummy couplings 56 are selected in such a manner that the power take-off shaft 14 rotates in one direction D. A necessary number of feed shafts 17 may be coupled to the motion converter 13. In the solution according to FIG. 1, the number of feed shafts 17 to be coupled to the motion converter 13 may be two, in the solution of FIG. 3, the number of feed shafts 17 to be coupled may be four, in the solution of FIG. 5, the number of feed shafts 17 to be coupled may be five, and further, in the solution of FIG. 6, the number of feed shafts 17 to be coupled may be one. Furthermore, it is possible to couple the feed shafts 17 of a plurality of collecting devices 8 to the same motion converter 13, whereby the number of feed shafts 17 may be large. In addition, it is possible to couple one or more flywheels 61 to the power take-off shaft 14 or to another suitable location in the motion converter 13, which may even out the rotational motion generated by the motion converter 13.

Figure 11A:
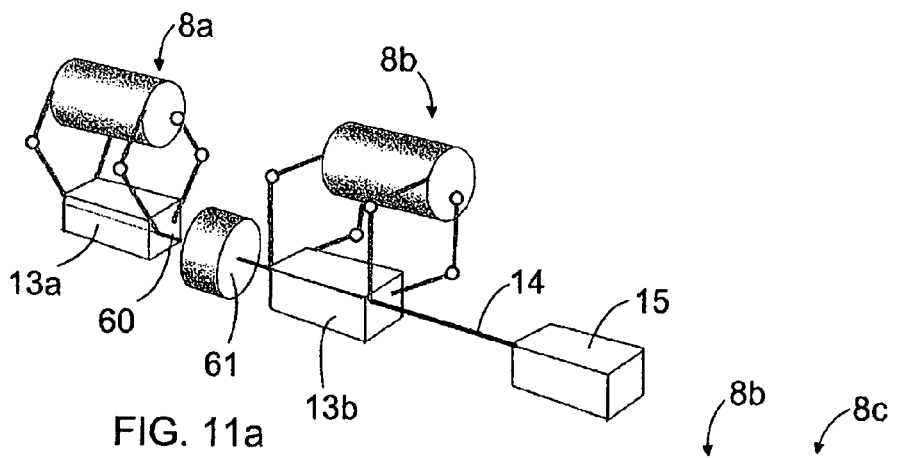
Figure 11B:
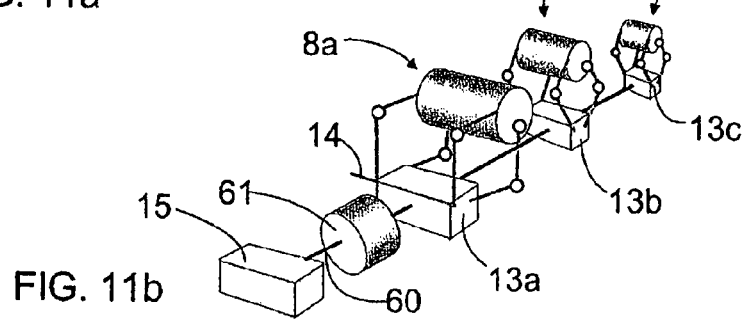

In FIG. 11a, two collecting devices 8a, 8b are coupled up by means of a shaft 60. Furthermore, one or more flywheels 61 may be coupled to the shaft 60 for evening out the rotational motion generated with the motion converters 13a, 13b. The shaft 60 and the flywheel 61 may be arranged between two parallel or two successive collecting devices. In FIG. 11b, three consecutive collecting devices 8a, 8b, 8c are coupled up by means of the shaft 60, and their common power take-off shaft 14 is provided with one or more flywheels 61 for evening out the rotational motion. In the solutions according to FIGS. 11a and 11b, a necessary number of flywheels 61 may be placed in the intermediate shafts 60, the power take-off shaft 14 and the internal structures of the motion converters 13.

Figure 12A:
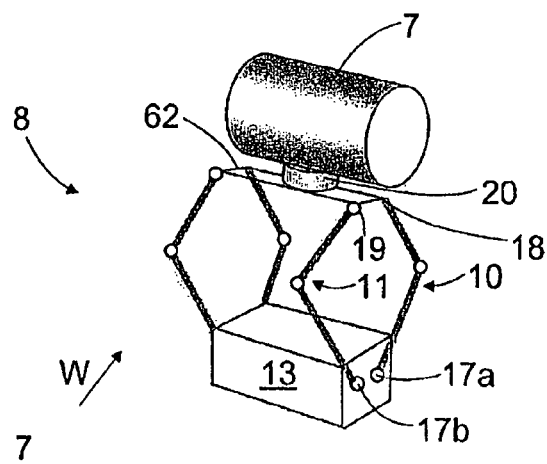
FIGS. 12b and 12c show a top view of the collecting device of FIG. 12a seen in breakers having different directions, FIG. 13a schematically shows a manner of arranging collecting devices in a superstructure arranged above the surface of water and for coupling them non-mechanically in series, and FIG. 13b schematically shows a manner of arranging collecting devices in a superstructure and at the bottom of a water system.
Figure 12B:
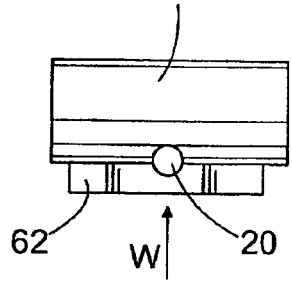
Figure 12C:
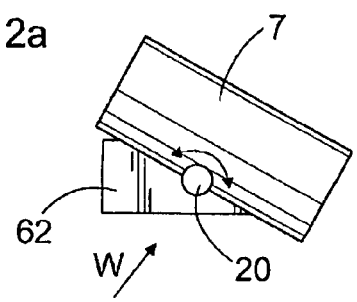

FIG. 12a shows a collecting device 8, wherein a float 7 is coupled by means of a turning device 20, a turning support 62 and support bars 10, 11 to a body, the body being the casing or body of an actuator 12 or a motion converter 13. The upper end of the support bar 10 is coupled with a rigid fixation 18 to the turning support 62, and the upper end of the support bar 11 is coupled by means of an articulation 19 to the turning support 62. Although the support bars 10, 11 are coupled to the float 7 through the turning support 62 and the turning device 20, this coupling corresponds functionally to a situation wherein the upper ends of the support bars 10, 11 are fastened directly to the float 7, as was shown in the previous figures. The turning device 20 enables the turning of the float 7 in accordance with the direction W of the waves. As is seen from FIGS. 12b and 12c, the turning device 20 may be arranged eccentrically relative to the mid shaft of the elongated float 7, whereby the float 7 always tends to turn in such a manner that its mid shaft is transverse relative to the direction W of travel of the waves. The turning device 20 enables substantially only a turning around the vertical shaft. A plurality of collecting devices 8 similar to those in FIG. 12a to 12c can be coupled in series.

In some cases, the float 7 may be fastened without articulation or turning device to the support member. Such a support member may be for instance a fixed or detachable lug in the float or another projection, to which the upper ends of the support bars may be fastened in such a manner that at least the upper end of one support bar has a rigid fixation to the support member.

Figure 13A:
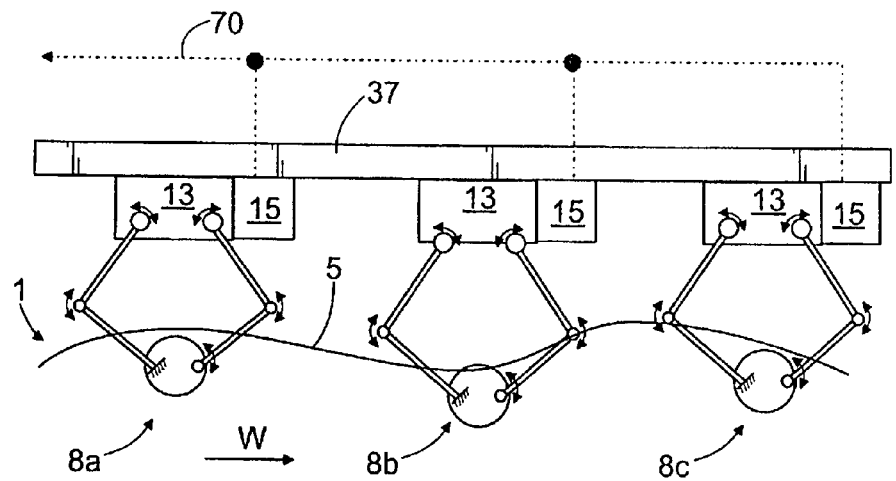

FIG. 13a shows a superstructure 37 to be arranged above the surface 5 of waves 1 and to which one or more collecting devices 8a to 8c may be fastened. The superstructure 37 may be a bridge or a pier, for example, under which the collecting devices 8a to 8c may be arranged. Each collecting device 8a to 8c comprises a special energy converter 15, which may be an electric generator for converting motion energy into electrical energy, or it may be a pressure medium pump for converting motion energy into pneumatic or hydraulic pressure. In this case, the energy converters 15 of the collecting devices 8a to 8c may be coupled in series by means of one or more coupling lines 70. The coupling line 70 may be composed of electrical conductors or medium conduits. In this embodiment, an individual collecting device 8 can be decoupled relatively easily from the series for the duration of maintenance, for example. Furthermore, the collecting device 8 can be easily replaced. In addition, the displacement of non-mechanically coupled collecting devices 8 for instance in accordance with the direction of the waves 1 is simpler than in mechanically coupled solutions. Furthermore, since the motion converter 13 and the energy converter 15 may be above the water level 5, their waterproofness does not have to be so absolute as in underwater devices. Placement above the water level 5 also facilitates maintenance and the replacement of devices.

Figure 13B:
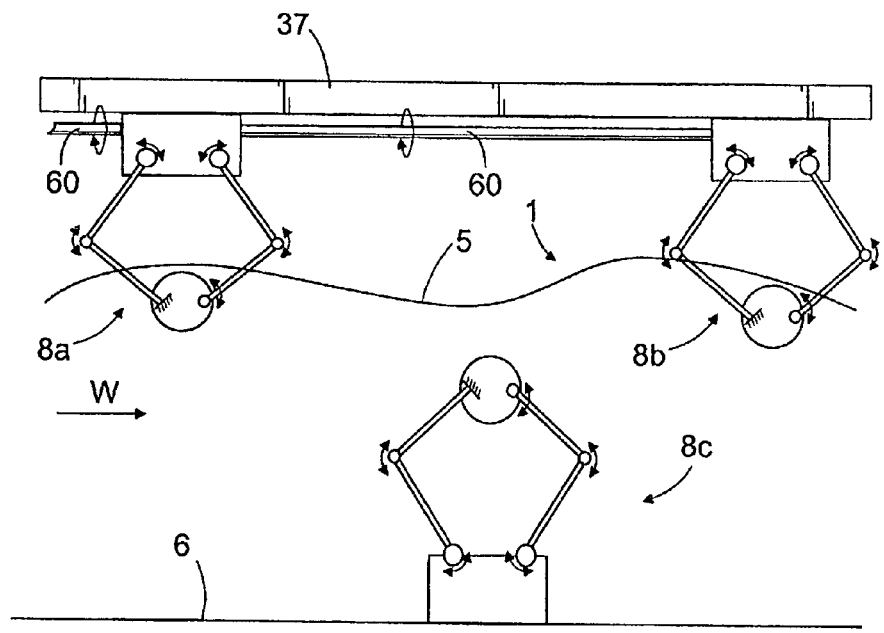

In FIG. 13b, In FIG. 13b, collecting devices 8a, 8b are arranged between a superstructure 37 and the upper surface 5 of water, and at the bottom 6 of a water system. Such an arrangement may be applied to rivers and other streaming water systems, for example. The collecting devices 8a, 8b coupled to the superstructure 37 and the collecting devices 8c arranged at the bottom 6 may be arranged alternately in the longitudinal direction and the lateral direction of the water system, whereby the collecting devices 8a to 8c may overlap, which is advantageous as regards the use of space. FIG. 13b further shows that at least part of the collecting devices 8a, 8b can be coupled up by means of an intermediate shaft 60.

It is also feasible to apply collecting devices of different types than those described in the figures and the descriptions thereof in the manner according to the invention.

In some cases, the features presented in the present application can be employed as such, irrespective of other features. On the other hand, the features presented in the present application can be combined for generating various combinations, when need be.

The drawings and the related description are only intended to illustrate the idea of the invention. The details of the invention may vary within the scope of the claims.

The invention claimed is:

1. A method of recovering energy contained by waves, the method comprising:
   receiving wave energy with at least two collecting devices, each of which comprises at least one float;
   arranging the floats substantially entirely below a surface of the water, wherein the waves are able to displace the floats;
   converting a reciprocating movement generated by the float into a unidirectional rotational motion in a motion converter;
   transferring the movement of the floats by means of at least one power transmission member to at least one actuator comprised by the collecting device; and
   receiving the movement of the float with the actuator,
   transferring the movement of the float to the motion converter in each collecting device; and
   coupling at least two collecting devices comprising a motion converter in series,
   wherein the altitude of the float relative to the water level is adjusted by at least one adjusting device, and said adjusting of the altitude of the float relative to the water level is carried out by adjusting the mass of the float.

2. A method as claimed in claim 1 comprising: arranging at least two collecting devices in parallel viewed in the lateral direction; and coupling at least two parallel collecting devices in series.

3. A method as claimed in claim 1, comprising: arranging at least two collecting devices successively viewed in a travel direction of the wave; and coupling at least two successive collecting devices in series.

4. A method as claimed in claim 1, comprising: transferring the rotational motion from the motion converter to at least one energy converter arranged in connection with each collecting device, in which converter motion energy is converted into some other energy.

5. A method as claimed in claim 4, comprising: transferring the rotational motion from the motion converter to an electric generator serving as an energy converter, in which generator the motion energy is converted into electrical energy; and coupling at least two collecting devices electrically in series.

6. A method as claimed in claim 4, comprising: transferring the rotational motion from the motion converter to a pressure medium pump serving as an energy converter, in which pump the motion energy is converted into pressure energy; and coupling at least two collecting devices in series by means of one pressure medium conduit.

7. A method as claimed in claim 1, comprising: coupling up the motion converters of at least two collecting devices by means of at least one mechanical power transmission member.

8. A method as claimed in claim 7, comprising: coupling up the motion converters of at least two collecting devices by means of at least one intermediate shaft; summing up a plurality of parallel rotational motions of a plurality of motion converters into one parallel rotational motion; and conveying the summed-up rotational motion by means of at least one power take-off shaft to at least one energy actuator.

9. A method as claimed in claim 7, comprising: evening up the rotational motion generated with the motion converter of the collecting device by means of at least one flywheel.

10. A method as claimed in claim 1, comprising: employing an elongated float in the collecting device; and restricting the movement of the float in the direction of the longitudinal shaft.

11. An arrangement for recovering energy contained by waves, the arrangement being adapted to:
    receive wave energy with at least two collecting devices, each of which comprises at least one float;
    convert a reciprocating movement generated by the float into a unidirectional rotational motion in a motion converter;
    transfer the motion generated by the waves for the floats by means of at least one power transmission member to at least one actuator comprised by each collecting device; and
    transfer the movement of the float in each collecting device to the motion converter
    wherein at least two collecting devices comprising a motion converter are coupled in series,
    wherein the float is arranged substantially entirely below a surface of the water, and
    wherein the arrangement further comprises at least one adjusting device for adjusting the altitude of the float relative to the water level, and said adjusting the altitude of the float relative to the water level is carried out by adjusting the mass of the float.

12. An arrangement as claimed in claim 11, wherein a lifting force of the float is dimensioned in each collecting device in such a manner that the mutual relationship between gravitation and the lifting force that the float is subjected to places the float substantially entirely below water level.

13. An arrangement as claimed in claim 11, wherein at least two collecting devices are arranged in parallel viewed in the lateral direction; and at least two parallel collecting devices are coupled in series.

14. An arrangement as claimed in claim 11, wherein at least two collecting devices are arranged in succession viewed in a travel direction of the wave; and at least two successive collecting devices are coupled in series.

15. An arrangement as claimed in claim 11, wherein at least one energy converter is arranged in connection with each collecting device for converting motion energy into some other energy.

16. An arrangement as claimed in claim 15, wherein the energy converters of at least two collecting devices are coupled up with a connection that transfers non-mechanical energy.

17. An arrangement as claimed in claim 11, wherein the motion converters of at least two collecting devices are coupled up by means of at least one mechanical power transmission member.

18. An arrangement as claimed in claim 17, wherein the motion converters of at least two collecting devices are coupled up by means of at least one intermediate shaft; and the summed-up rotational motion of a plurality of motion converters is arranged to be transferred by means of at least one power take-off shaft to at least one common energy actuator.

19. An arrangement as claimed in claim 11, wherein the arrangement comprises at least one flywheel for evening out the rotational motion generated with the motion converter.

20. An arrangement as claimed in claim 11, wherein a plurality of collecting devices is arranged in parallel viewed in the lateral direction, the collecting devices being arranged to form a row; and at least two successive rows are arranged.

21. An arrangement as claimed in claim 11, wherein the collecting devices are supported to the water system by means of an artificial support structure.

22. An arrangement as claimed in claim 21, wherein the support structure comprises a cover and a bottom; and the collecting devices are supported between the cover and the bottom.

23. An arrangement as claimed in claim 11, wherein the collecting devices are supported to a floating structure.

24. An arrangement as claimed in claim 11, wherein the arrangement comprises at least one turning device for setting the direction of the floats to a predetermined position relative to the travel direction of the waves.

* * * * *